United States Patent
Li et al.

(10) Patent No.: US 10,531,351 B2
(45) Date of Patent: Jan. 7, 2020

(54) METHOD FOR IN-NETWORK, DYNAMIC RADIO ACCESS NETWORK FUNCTIONAL SPLIT CONFIGURATION BY RADIO ACCESS NETWORK DATA PLANE FORWARDING NODES

(71) Applicant: NEC Europe Ltd., Heidelberg (DE)

(72) Inventors: Xi Li, Heidelberg (DE); Andres Garcia-Saavedra, Heidelberg (DE); Fabian Schneider, Heidelberg-Bahnstadt (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 15/788,880

(22) Filed: Oct. 20, 2017

(65) Prior Publication Data

US 2019/0124577 A1  Apr. 25, 2019

(51) Int. Cl.
*H04W 36/30* (2009.01)
*H04W 16/10* (2009.01)
(Continued)

(52) U.S. Cl.
CPC ......... *H04W 36/30* (2013.01); *H04L 41/0816* (2013.01); *H04L 41/0823* (2013.01);
(Continued)

(58) Field of Classification Search
CPC . H04L 69/324; H04L 69/22; H04L 29/08153; H04L 8/162; H04L 8/171;
(Continued)

(56) References Cited

U.S. PATENT DOCUMENTS 7,441,022 B1 *  10/2008  Schuba ............... H04L 41/5025
706/47
2014/0092736 A1  4/2014  Baillargeon
(Continued)

FOREIGN PATENT DOCUMENTS

WO   WO 2017174111 A1   10/2017
WO   WO 2018077435 A1   5/2018

OTHER PUBLICATIONS

3GPP TR 38.801 V1.0.0 (Dec. 2016), $3^{rd}$ Generation Partnership Project; Technical Specification Group Radio Access Network; Study on New Radio Access Technology; Radio Access Architecture and Interfaces (Release 14), Dec. 2016, pp. 1-72.
(Continued)

*Primary Examiner* — Jeffrey M Rutkowski
*Assistant Examiner* — Sudesh M Patidar
(74) *Attorney, Agent, or Firm* — Leydig, Voit & Mayer, Ltd.

(57) ABSTRACT

A method for configuring resources of a radio access network (RAN) including a radio unit includes monitoring, by a data plane node, a quality of at least one portion of a link between the radio unit and a central processing unit of the RAN; determining, by the data plane node, that the quality of the at least one portion of the link has changed relative to a previous quality of the at least one portion of the link; generating, by the data plane node according to local control logic programmed into the data plane node, a decision specifying a placement for one or more RAN functions; and transmitting, by the data plane node to one or both of the radio unit and the central processing unit, a notification including the decision specifying the placement for the one or more RAN functions.

21 Claims, 7 Drawing Sheets

(51) Int. Cl.
| | |
|---|---|
| H04L 12/24 | (2006.01) |
| H04W 24/02 | (2009.01) |
| H04L 29/08 | (2006.01) |
| H04W 16/04 | (2009.01) |
| H04W 92/02 | (2009.01) |
| H04L 12/26 | (2006.01) |
| H04W 88/08 | (2009.01) |
| H04W 72/08 | (2009.01) |

(52) U.S. Cl.
CPC ...... *H04L 41/0896* (2013.01); *H04L 41/5025* (2013.01); *H04L 67/1002* (2013.01); *H04W 16/04* (2013.01); *H04W 16/10* (2013.01); *H04W 24/02* (2013.01); *H04W 92/02* (2013.01); *H04L 43/08* (2013.01); *H04L 43/16* (2013.01); *H04W 72/085* (2013.01); *H04W 88/085* (2013.01)

(58) Field of Classification Search
CPC ..... H04L 8/189; H04L 8/945; H04L 12/2671; H04L 12/2418; H04L 12/40136; H04W 28/06; H04W 28/16; H04W 36/30; H04W 92/02; H04W 16/10; H04W 16/04; H04W 36/305; H04W 36/0079; H04M 2215/7428; H04N 21/64723; G01R 31/08
USPC ............. 370/311, 254, 312, 236.1, 230, 229, 370/395.2, 395.41; 455/507, 450, 452, 2
See application file for complete search history.

(56) References Cited

U.S. PATENT DOCUMENTS

| | | | | |
|---|---|---|---|---|
| 2014/0362688 | A1* | 12/2014 | Zhang | H04W 72/0486 370/230 |
| 2016/0112460 | A1* | 4/2016 | Li | H04L 63/0236 726/1 |
| 2016/0134483 | A1* | 5/2016 | Zhou | H04L 12/6418 370/351 |
| 2016/0134727 | A1 | 5/2016 | Merkel et al. | |
| 2017/0367081 | A1* | 12/2017 | Cui | H04W 28/0231 |
| 2017/0373890 | A1* | 12/2017 | Fertonani | H04L 25/02 |
| 2018/0041905 | A1* | 2/2018 | Ashrafi | H04W 16/10 |

OTHER PUBLICATIONS

Small Cell Forum Release 6.0, Document 159.06.02, Small cell virtualization: Functional splits and use cases, Jan. 2016, pp. 1-63.
Rost Peter et al: "Cloud technologies for flexible 5G radio access networks", IEEE Communications Magazine, IEEE Service Center, Piscataway, US, vol. 52, No. 5, May 1, 2014 (May 1, 2014), pp. 68-76, XP011559173.
Maeder Andreas et al: "Towards a flexible functional split for cloud-RAN networks", 2014 European Conference on Networks and Communications (EUCNC), IEEE, Jun. 23, 2014 (Jun. 23, 2014), pp. 1-5, XP032629363.

* cited by examiner

METHOD FOR IN-NETWORK, DYNAMIC RADIO ACCESS NETWORK FUNCTIONAL SPLIT CONFIGURATION BY RADIO ACCESS NETWORK DATA PLANE FORWARDING NODES

FIELD

The invention relates to mobile or wireless networks and mobile or wireless network architectures, and particularly to methods and systems for providing functional splits in radio access networks.

BACKGROUND 5G networks will allow for various degrees of Radio Access Network (RAN) centralization, varying from no centralization D-RAN (Distributed), to fully Centralized-RAN (C-RAN). In order to allow for such varying degrees of RAN centralization, 5G mobile transport networks will be required to support RAN functional splits in a flexible manner. Thereby, the division between fronthaul, which is the interface between a radio unit (RU) and an associated centralized-processing unit (CU), and backhaul, which is the interface connecting base stations and the mobile core, will blur since varying portions of functionality of the base stations will be distributed across the transport network. In this context, a new generation of transport network is proposed for 5G, namely crosshaul, integrating multi-technology fronthaul and backhaul segments into a common transport infrastructure.

Centralizing base station (BS) functionality as much as a possible at a CU can have significant advantages in reducing operational costs by providing, e.g., common refrigeration, single-point maintenance, etc. Furthermore, centralization of base station functionality can achieve higher capacity gains by providing, e.g., joint signal processing, coordinated resource allocation, etc. However, transport requirements for the fronthaul, e.g. network capacity, delay, jitter, etc., are very tight and can become more stringent when more functions are centralized at a CU. For example, Table 1 below provides analysis of a functional split described in *Small Cell Virtualization Functional Splits and Use Cases* from Small Cell Forum, Release 6.0 Version 159.06.02 issued on Jan. 13, 2016.

TABLE 1

Table 1: Functional splits analysis: 1 user/TTI, 20 MHz BW, IP MTU 1500B; DL: MCS, 2 × 2 MIMO, 100RBs, 2 TBs of 75376 bits/subframe, CFI = 1; MCS 23, 1 × 2 SIMO, 96 RBs, 1 TB of 48936 bits/subframe

| Split # | BS Functional Decomposition | DL/UL BW Requirement (Mb/s) | Delay Requirement (µs) | Gains |
|---|---|---|---|---|
| A | RRC-PDCP | 151/48 | 30,000 | Enables L3 functionality for multiple small cells to use the same HW<br>Enhanced mobility across nodes w/o inter-small cell data forwarding/signalling<br>Reduced mobility-related signalling to the mobile core segment<br>No X2 endpoints between small cells and macro eNBs<br>Control plane and user plane separation |
| B | PDCP-RLC | 151/48 | 30,000 | Enables L3 and some L2 functionality to use the same HW |
| C | RLC-MAC | 151/48 | 6000 | Resource sharing benefits for both storage and processor utilization |
| D | Split MAC | 151/49 | 6000 | Synchronized coordination and control of multiple cells<br>Coordination across cells enables CA, CoMP, eICIC or cross carrier scheduling |
| E | MAC-PHY | 152/49 | 250 | Enhancements to CoMP with RU frame alignment and centralized HARQ |
| F | PHY Split I | 173/452 | 250 | More opportunities to disable parts of the CU at quiet times to save power |
| G | PHY Split II | 933/903 | 250 | Central L1 CU can be scaled based on average utilization across all cells |
| H | PHY Split III | 1075/922 | 250 | Smaller CU results in less processing resource and power saving |
| I | PHY Split IIIb | 1966/1966 | 250 | Enhancements to joint reception CoMP with uplink PHY level combining |
| J | PHY Split IV | 2457.6/2457.6 | 250 | |

A centralized software defined network (SDN) control approach for integrated fronthaul and backhaul network resource management is described in PCT/EP 2016/057357. In the centralized SDN control approach described therein, data plane nodes inform the centralized SDN controller upon detecting any link or node changes via a control channel. Then the SDN controller decides whether it is necessary to update configuration settings for data plane network resources (e.g. data plane nodes) in order to react to the corresponding changes, and if deciding that such an update is necessary, triggers the update of the data plane network resources via the control channel. In response, the data plane network resources (e.g. data plane nodes such as the RU, CU, base stations, forwarding nodes such as switches and routers, etc.) will apply necessary changes to effectuate the update.

SUMMARY

In an embodiment, the present invention provides a method for configuring resources of a radio access network (RAN) including a radio unit. The method includes monitoring, by a data plane node, a quality of at least one portion of a link between the radio unit and a central processing unit of the RAN; determining, by the data plane node, that the quality of the at least one portion of the link has changed relative to a previous quality of the at least one portion of the link; generating, by the data plane node according to local control logic programmed into the data plane node, a decision specifying a placement for one or more RAN functions; and transmitting, by the data plane node to one or both of the radio unit and the central processing unit, a notification including the decision specifying the placement for the one or more RAN functions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
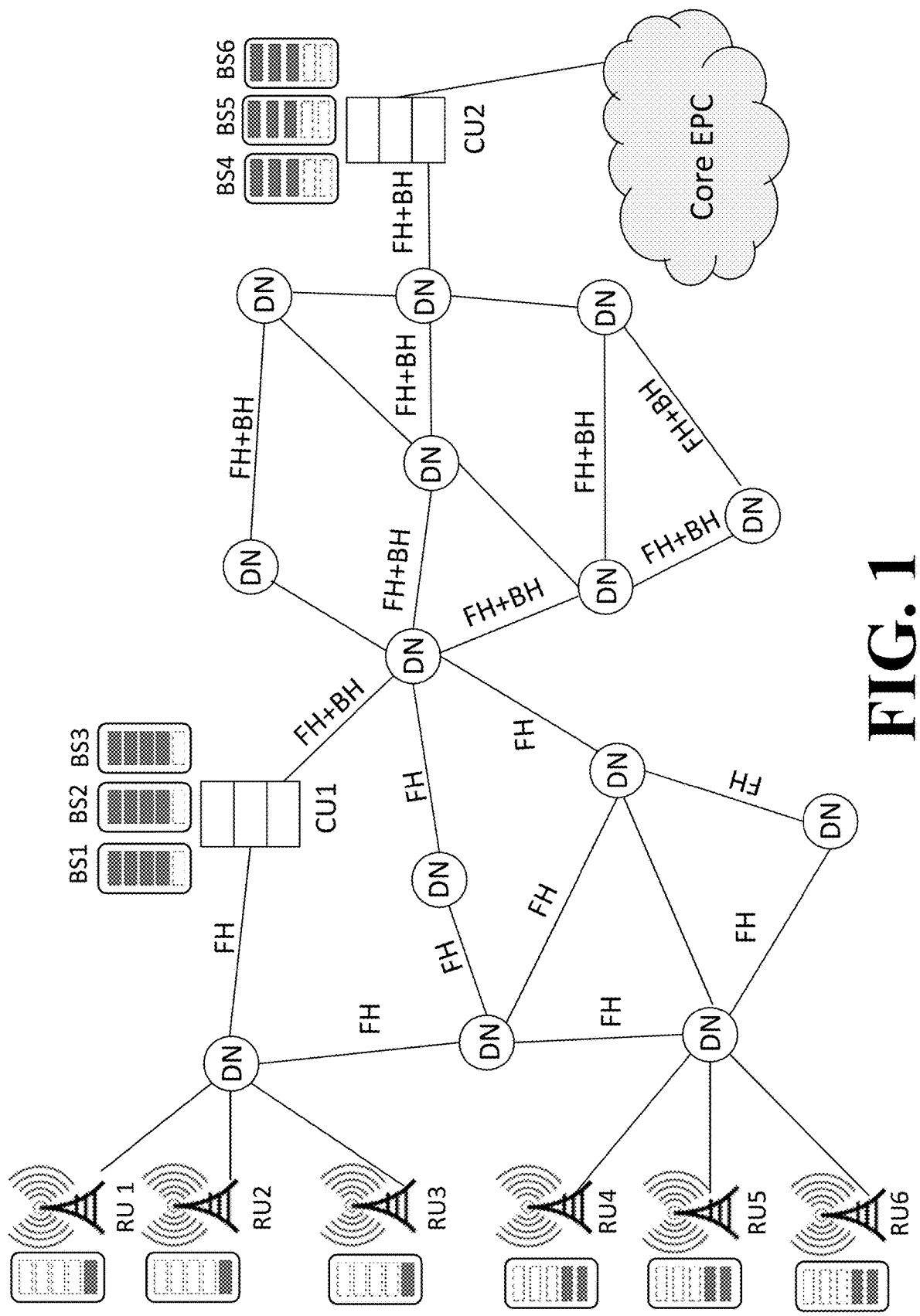
FIG. 1 depicts a radio access network (RAN) having an integrated fronthaul and backhaul network, i.e. a crosshaul network, according to an embodiment of the invention.

Supporting flexible RAN functional splits while meeting their most stringent requirements is one of the main challenges of providing a crosshaul transport network. To support dynamic RAN functional splits, support for a number of different capabilities is required. Reacting quickly to network/load changes requires support for dynamic functional split changes in a timely and efficient manner. Reacting quickly to network/load changes requires rapid detection of critical network/load changes and rapid reporting of said changes to related network elements. Therefore, network monitoring and quick detection of any critical network changes is a crucial task for a resilient crosshaul transport network. Furthermore, dynamic RAN functional splits must ensure that the stringent transport requirements of fronthaul traffic are met. This requires continuous network monitoring to allow for adaptive re-configuration.

In a centralized SDN control system, unpredictable delays may occur in the control plane. Such delays can be caused by latency between a controller and switches (such latency can vary depending on a load of the control network and the individual switches) and latency inside an SDN switch between an SDN agent and the forwarding pipeline. Furthermore, delays can be caused by overload in the control network (which can also be referred to as the control channel, e.g. in OpenFlow) or in the SDN controller. Delays can also be caused by control channel failures, which will prevent the network from functioning as desired. These delays in the control plane can delay or prevent data plane nodes from reacting to network changes. Timely network adaptations (as required for RAN functional split changes) rely on the ability of data plane nodes to rapidly and reliably react to network changes. Therefore, implementation of RAN functional split changes can be problematic when delays in the control plane cause data plane nodes to react to network changes in a delayed manner or prevent data plane nodes from reacting to network changes altogether—as can occur in large networks with a high number of nodes and links where the control channels may not be ideal.

Methods according to embodiments of the invention provide for dynamic RAN functional splits to adapt to actual network/load changes (e.g. wireless link changes) in a fast and timely manner. According to such methods, RAN functional split decision-making can be offloaded, at least in part, from a central SDN controller to distributed data plane nodes in order to improve RAN resiliency and reaction speed. In this manner, RAN functional split decision-making is distributed, at least in part, to data plane nodes. Such data plane nodes, e.g. switches, routers, etc., can be remotely located from one another and wirelessly connected to one another. According to embodiments of the invention, an approach for offloading RAN functional split decision-making to data plane nodes can leverage stateful flow processing and in-switch packet generation mechanisms. Such an approach can consider a complete network or path between an RU and a CU.

According to embodiments of the invention, the approach of distributing RAN functional split decision-making to data plane nodes can be used to complement a centralized SDN control approach to enable dynamic RAN functional split changes thereby resulting in a hierarchical RAN functional split decision-making process. In some such embodiments, decisions regarding RAN functional splits are made centrally by an SDN controller when, e.g., the control channels are ideal without severe delays and losses and the decisions regarding RAN functional splits are made in a distributed manner at local data plane nodes when control channel conditions are, e.g., non-ideal. In order to keep an updated control plane, the data plane nodes will inform the centralized SDN controller of local decisions regarding RAN functional splits. For example, in-switch packet generation and stateful flow processing can be leveraged to propagate distributed decisions through a data plane towards an RU and a CU.

The distribution of RAN functional split decision-making, at least in part, to data plane nodes can address problems in the control plane (e.g. excessive delays, losses, overload, or even failures) that can prevent data plane nodes from quickly reacting to network changes. Therefore, by distributing RAN functional split decision-making, at least in part, to data plane nodes, embodiments of the present invention can address certain problems of a centralized SDN control approach.

Embodiments of the present invention can utilize a software defined network (SDN) or network function virtualization (NFV) based architecture to enable a flexible and software-defined reconfiguration of networking elements through a unified data plane and control plane interconnecting distributed 5G radio access and core network functions. Such SDN/NFV based architecture can be hosted on in-network cloud infrastructure. Furthermore, such SDN/NFV based architecture follows the principles of SDN architecture proposed by the Open Networking Foundation (ONF) by decoupling the data and control planes.

Embodiments of the present invention provide methods for configuring resources of a radio access network (RAN) including a radio unit. Such methods can include monitoring, by a data plane node, a quality of at least one portion of a link between the radio unit and a central processing unit of the RAN; determining, by the data plane node, that the quality of the at least one portion of the link has changed relative to a previous quality of the at least one portion of the link; generating, by the data plane node according to local control logic programmed into the data plane node, a decision specifying a placement for one or more RAN functions; and transmitting, by the data plane node to one or both of the radio unit and the central processing unit, a notification including the decision specifying the placement for the one or more RAN functions. Methods can also include receiving, by the data plane node, programming from a software defined network (SDN) controller by which the local control logic is programmed into the data plane node. Furthermore, methods can additionally include transmitting, by the data plane node to the SDN controller, a notification including the decision specifying the placement for the one or more RAN functions.

In one or more embodiments, methods can include, as a component of the decision specifying the placement for one or more RAN functions, specifying a RAN functional split from a group of RAN functional splits. Methods can further include forwarding, by the data plane node, traffic between the radio unit and the central processing unit according to a set of rules determined according to the specified RAN functional split. Each RAN functional split of the group of RAN functional splits can specify a location from a plurality of locations at which each of a plurality of baseband processing functions is to be performed. The locations at which the baseband processing functions are to be performed include the radio unit and the central processing unit. The plurality of baseband processing functions can include physical layer functions, data link layer functions, and network layer functions. More specifically, the baseband processing functions can include implementation of protocols including physical layer protocols, media access control (MAC) protocols, radio link control (RLC) protocol, packet data convergence protocol (PDCP), and radio resource control (RRC) protocol.

In one or more embodiments, monitoring the quality of the at least one portion of the link between the radio unit and the central processing unit can include configuring, by the SDN controller, a source forwarding element and a target forwarding element as monitoring probes such that one or more probe packets for performing the measurement task are generated by the one or more monitoring probes. The source forwarding element and the target forwarding element can be, e.g. switches or routers along the path from the radio unit to the central processing unit. The term "monitoring probe" can refer to a program executed by one or more of the source forwarding element and the target forwarding element. The one or more probe packets can include a ping probe packet generated by the source forwarding element for performing a measurement task and a pong probe packet generated by the target forwarding element. The SDN controller can configure the monitoring probes to generate one or more probe packets by creating probe packet template information that is provided to the monitoring probes, wherein the probe packet template information includes one or more probe packet templates and/or probe packet template handling instructions. The monitoring probes can thereby be triggered to generate the one or more probe packets based on the provided packet template information. Triggering instructions may be provided to the monitoring probes by including them into the packet template information. Such triggering instructions may include configuring a timer as a trigger for generating the one or more probe packets. For example, the triggering instructions may include configuring a timer at the source forwarding element, wherein the timer triggers the generation of one or more ping probe packets that are sent to the target forwarding element. Furthermore, the triggering instructions may include configuring a reception of a predetermined probe packet as a trigger for generating a new probe packet, in particular a pong probe packet.

Monitoring the quality of the at least one portion of the link between the radio unit and the central processing unit can further include taking one or more measurements. The one or more measurements can be based on time-stamping performed by at least one of the monitoring probes. Time stamps can be recorded and/or added to probe packets directly on and by the forwarding elements and can be based on a time provided by an internal clock of at least one of the forwarding elements. The taking one or more measurements can include taking a round-trip time measurement, a one-way delay measurement, a jitter measurement, a throughput measurement, and/or an available bandwidth measurement. The result of the taking of one or more measurements, i.e. a measurement result, can be computed after collecting measurement feedback, wherein the measurement feedback is based on returned probe packets, in particular, returned pong probe packets. The measurement result may be computed by the SDN controller and/or by a dedicated measurement analysis component. The measurement feedback can include probe packets that are sent back to the SDN, wherein the probe packets may comprise collected information such as time stamps, statistic counters, etc.

Generally, network monitoring and/or network measurement may be performed on multi-hop paths through the network, due to the way that monitoring probes are deployed on the edge of the network, or at selected locations within the network. Yet with an SDN controlled measurement system all the above measurement techniques—i.e. round-trip time measurement, one-way delay measurement, jitter measurement, throughput measurement, and/or an available bandwidth estimation—which support multi-hop measurement can also be run on shorter paths and even individual links. Thus, with the option to perform accurate timed measurements while being able to generate the probe packets at each forwarding element in the network, once an SLA violation (i.e. a fault or degradation of performance) is detected on a multi-hop path, the software defined network controller can issue additional measurements on a sub-path until the source of the problem is identified. Thus, pinpointing sources of SLA violations can be provided.

In one or more embodiments, determining that the quality of the at least one portion of the link has changed relative to a previous quality of the at least one portion of the link can include comparing a measurement result on a portion of a link from a first, earlier point in time with a measurement result on the same portion of the link from a second, latter point in time. Determining that the quality of the portion of the link has changed may include determining that the difference between a measurement result, e.g. the result of a round-trip time measurement, a one-way delay measurement, a jitter measurement, a throughput measurement, and/or an available bandwidth measurement, from a first, earlier point in time and a corresponding measurement result from a second latter point in time exceeds a threshold.

Embodiments of the present invention provide systems for dynamic RAN functional splits that rapidly adapt to actual network/load changes (e.g. wireless link changes). Such systems can include an SDN controller, one or more data plane nodes (which can be, e.g., routers, switches, and hubs), an RU, and a CU. The SDN controller can configure a source forwarding element and a target forwarding element as monitoring probes such that one or more probe packets for performing the measurement task are generated by the one or more monitoring probes—as described above. Furthermore, the SDN controller can also be configured to program local control logic inside each of the one or more data plane nodes.

In embodiments of the present invention utilizing a hierarchical RAN functional split decision-making process in which a centralized SDN control approach is complemented with a distributed decision approach, an RAN functional split decision made by a centralized SDN controller can conflict with an RAN functional split decision made locally by a data plane node. According to various embodiments of the invention, such conflicts can be resolved by a timer-based approach or by a command-based approach. For example, the SDN controller can coordinate with the data plane nodes by sending control messages commanding them to take over RAN functional split decision-making locally for a predefined period of time or by sending control messages requesting that they return RAN-functional split decision-making roles to the SDN controller. Alternatively, timers at the data plane nodes can be utilized. For example, a data plane node can start a timer upon detecting a need for a change of an RAN functional split, and if the data plane node does not receive a decision from the central controller regarding an updated RAN functional split before the timer expires, then the data plane node applies a local decision regarding an updated RAN functional split. A timer can also be used to determine a period of time for which the local decision remains effective before a decision from the SDN controller becomes effective.

Similarly, an RAN functional split decision made locally by a first data plane node can conflict with an RAN functional split decision made locally by a second data plane node. Such conflicts may arise when several distributed nodes along a path from an RU to a CU independently detect changes in the network and independently make decisions regarding an RAN functional split that should be implemented in response to the detected changes. In some cases, the independent decisions regarding the functional split that should be implemented may conflict with one another. In such instances, a mechanism for resolving such conflicts is necessary. According to various embodiments of the present invention, data plane nodes that make conflicting decisions regarding a functional split that should be implemented in response to detected network changes select the functional split has the lowest requirements for the fronthaul network. In some implementations, conflicts originating from data plane nodes regarding a functional split that should be implemented in response to detected network changes are resolved by one or both of a CU and an RU.

In case of path failure which may require a new path between the RU and the CU, the RU can try to use a backup/protection path (assuming already pre-computed during the planning phase). Once the link is down, the RU can change to the backup path. Then the first node on the backup path can apply the same local control logic inside the node to decide the proper functional split for that RU. Alternatively, the network can resort to the centralized SDN approach (if there is central controller in the system) to make a global optimized decision on the routing and functional splits for all RUs connecting to their associated CU.

FIG. 1 depicts a radio access network (RAN) having an integrated fronthaul and backhaul network, i.e. a crosshaul network, according to an embodiment of the invention. The RAN network depicted in FIG. 1 includes a plurality of radio units RU1 through RU6, centralized processing units CU1 and CU2, and a number of data plane nodes DN. Links between data plane nodes DN are designated as being a component of either a fronthaul network (FH), i.e. part of the interface between one of radio units RU1 through RU6 and one of centralized processing units CU1 and CU2, or a combination of a fronthaul network and a backhaul network (FH+BH), i.e. part of the interface between centralized processing unit CU1 and the core network (i.e. Core EPC) and also part of the interface between one of radio units RU1 through RU6 and one of centralized processing units CU1 and CU2. FIG. 1 additionally depicts a plurality of base stations BS1 through BS6, each of which corresponds to one of radio units RU1 through RU6 respectively. The functionality of each of base stations BS1 through BS3 is distributed between a combination of one of radio units RU1 through RU3 and the centralized processing unit CU1. Similarly, the functionality of each of the base stations BS4 through BS6 is distributed between a combination of one of radio units RU4 through RU6 and the centralized processing unit CU2.

Figure 2:
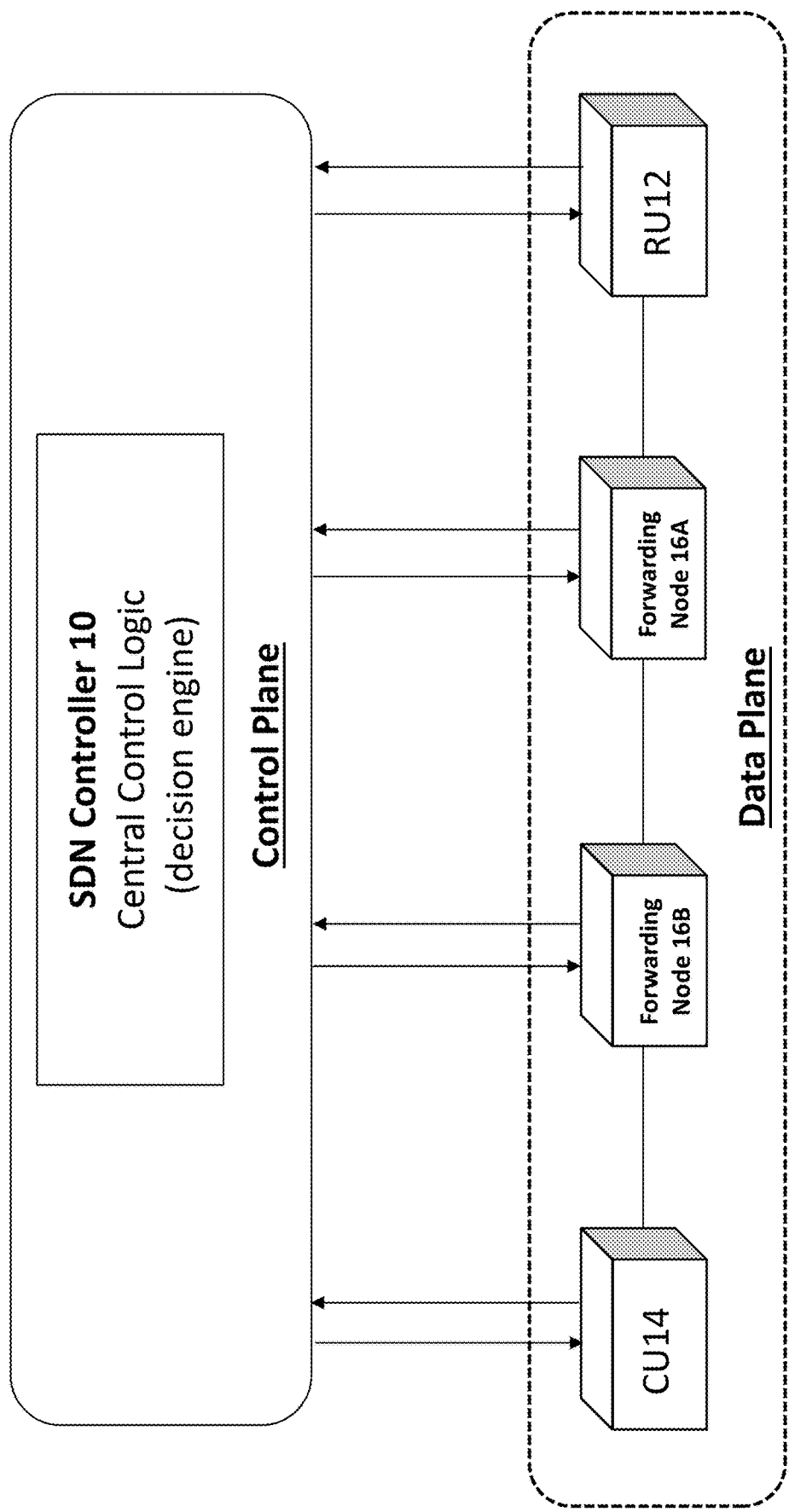
FIG. 2 is a block diagram depicting components of a data plane and a control plane of a radio access network (RAN) according to an embodiment of the invention.

FIG. 2 is a block diagram depicting components of a data plane and a control plane of a radio access network (RAN) according to an embodiment of the invention. The control plane includes an SDN controller 10, while the data plane includes a radio unit RU12, a centralized processing unit CU14, and forwarding nodes 16A and 16B. Forwarding nodes 16A and 16B can be, e.g., switches, routers, hubs, etc.

Figure 3:
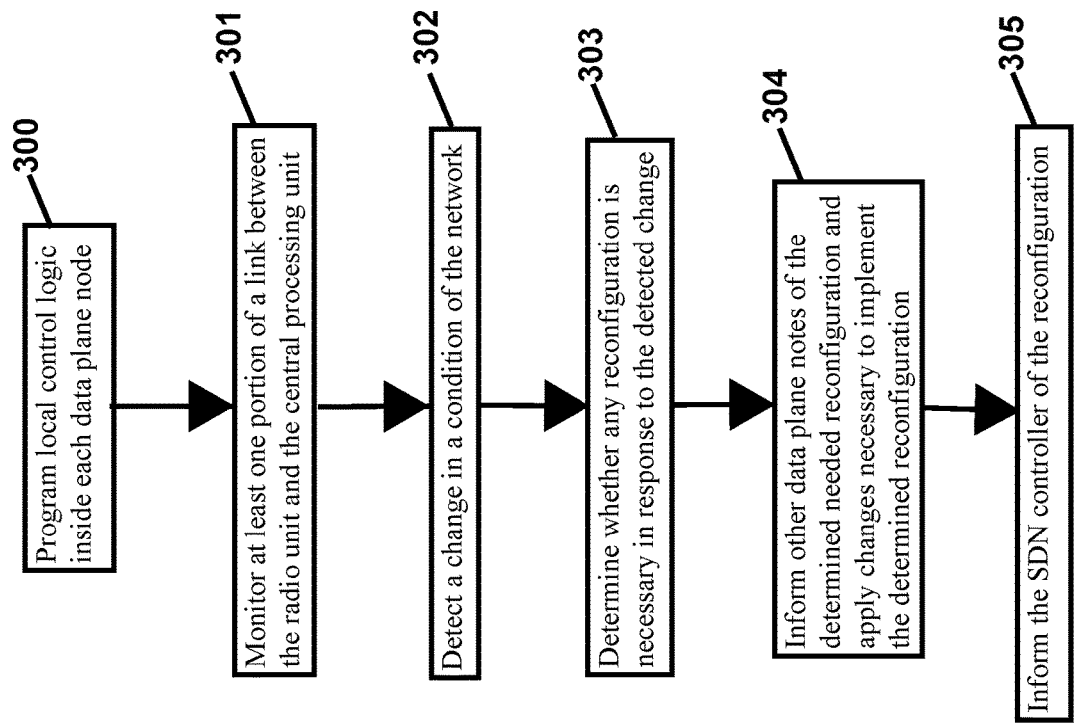
FIG. 3 is a flow diagram depicting a method of configuring resources of a radio access network (RAN) according to an embodiment of the invention.

FIG. 3 is a flow diagram depicting a method of configuring resources of a radio access network (RAN) according to an embodiment of the invention. At 300, the SDN controller 10 programs local control logic inside each data plane node, i.e. inside the radio unit RU12, the centralized processing unit CU14, and the forwarding nodes 16A and 16B. At 301, each of the data plane nodes monitors at least one portion of a link between the radio unit RU12 and the central processing unit CU14. The monitoring performed at 301 can include monitoring of network metrics such as available bandwidth and comparing delays with predefined threshold delay values. The monitoring at 301 can further include configuring, by the SDN controller, a source forwarding element and a target forwarding element as monitoring probes such that one or more probe packets for performing the measurement task are generated by the one or more monitoring probes—as described above. There are different network monitoring approaches in SDN, e.g. generating dedicated probes in the network to perform end-to-end monitoring, or leveraging the idea of in-switch packet generation. At 302, one of the data plane nodes detects a change in a condition of another data plane node or the at least one portion of the link between the radio unit RU12 and the central processing unit CU14. The detection of a change in condition of a node or a link can be based on network measurements, e.g. round-trip time (RTT), one-way delay (OWD), jitter, throughput, available bandwidth, etc. For example, one of the data plane nodes can detect a change in condition by determining that the available bandwidth falls below a certain threshold or delays of a traffic flow exceed certain thresholds.

Once a change in condition has been detected at 302, the data plane node that detected the change consults its local control logic and determines, at 303, whether any data plane nodes need to be reconfigured in response to the change detected at 302. For example, the data plane node that detected the change at 302 can, at 303, (i) identify which data plane nodes, including the radio unit RU12 and the central processing unit CU14 as well as other radio units and central processing units, are affected by the change, (ii) determine which of the identified data plane nodes are to be reconfigured, e.g. in order to implement an updated RAN functional split, and (iii) select a particular RAN functional split for each of the data plane nodes that is to be reconfigured. The decisions at 302 are made pursuant to the local control logic inside the data plane node that detected the change at 302. In alternative embodiments, the control logic inside the data plane nodes can be defined in a static table (as opposed to being programmed by the SDN controller 10 in 300). The local control logic according to which an RAN functional split is selected for each of the data plane nodes that is to be reconfigured can be based on a measured Modulation and Coding Scheme (MCS), or queue states inside a node, and/or on additional measurements of delays or available capacity.

At 304, the data plane node that has selected a particular RAN functional split for each of the data plane nodes that is to be reconfigured informs other data plane nodes of the determined needed reconfiguration and the selected RAN functional split and applies changes necessary to implement the determined reconfiguration as necessary. At 305, the data plane node that has selected a particular RAN functional split for each of the data plane nodes that is to be reconfigured informs the SDN controller 10 of the reconfiguration. In order to propagate the reconfiguration decisions across the data plane, an in-switch packet generation method can be utilized. Such packet generation method can include creating packet template information, including at least one of one or more packet templates or packet template handling instructions, providing the packet template information to one or more selected forwarding elements, the one or more selected forwarding elements being selected from the forwarding elements, triggering the one or more selected forwarding elements to generate an output packet based on the packet template information, and sending, by the selected forwarding elements, the generated output packet. The packet generation method is described in more detail in U.S. Patent Application Publication No. 2016/0134727, which is incorporated by reference herein.

Figure 4:
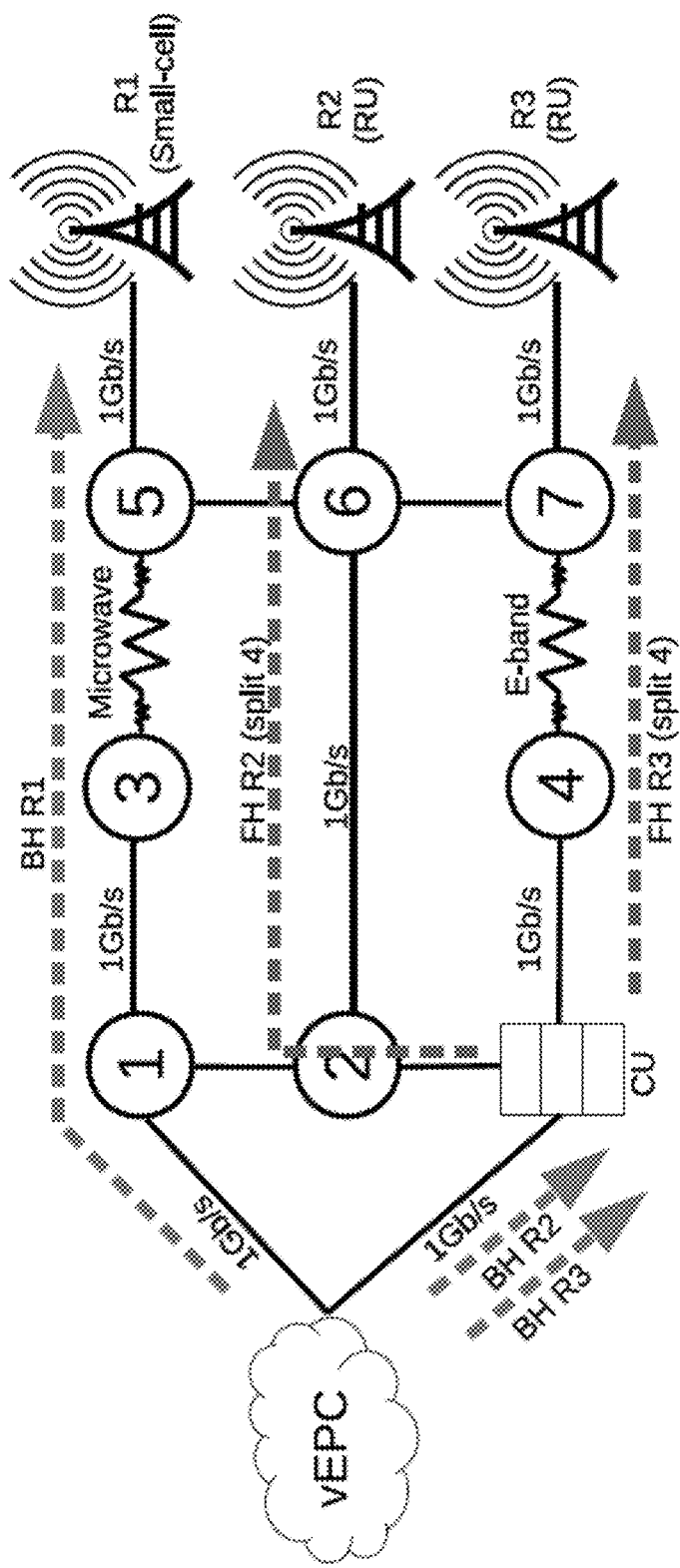
FIG. 4 is a structural diagram depicting components of a radio access network (RAN) having a first functional configuration according to an embodiment of the invention.

FIG. 4 is a structural diagram depicting components of a radio access network (RAN) having a first functional configuration according to an embodiment of the invention. In FIG. 4, the RAN includes a small-cell network R1 connected to a network core vEPC via a backhaul network BH R1. The backhaul network BH R1 includes links between the network core vEPC and a data plane node 1, between the data plane node 1 and a data plane node 3, between the data plane node 3 and a data plane node 5, and between the data plane node 5 and the small-cell network R1. The RAN further includes two radio units R2 and R3 and a centralized processor unit CU. The centralized processor unit CU is connected to the network core vEPC via backhaul networks BH R2 and BH R3 and the radio units R2 and R3 are connected to the centralized processor unit CU via fronthaul networks FH R2 and FH R3. The fronthaul network FH R2 includes links from the centralized processor unit CU to a data plane node 2, from the data plane node 2 to a data plane node 6, and from the data plane node 6 to the radio unit R2. In FIG. 4, the fronthaul network FH R2 is configured for a specific functional split, i.e. split 4. Similarly, the fronthaul network FH R3 includes links from the centralized processor unit CU to a data plane node 4, from the data plane node 4 to a data plane node 7, and from the data plane node 7 to the radio unit R3. The link between the node 4 and 7 is an mmWave link (E-band, at 70-80 GHz). In FIG. 4, the fronthaul network FH R3 is configured for a specific functional split, i.e. split 4.

Figure 5:
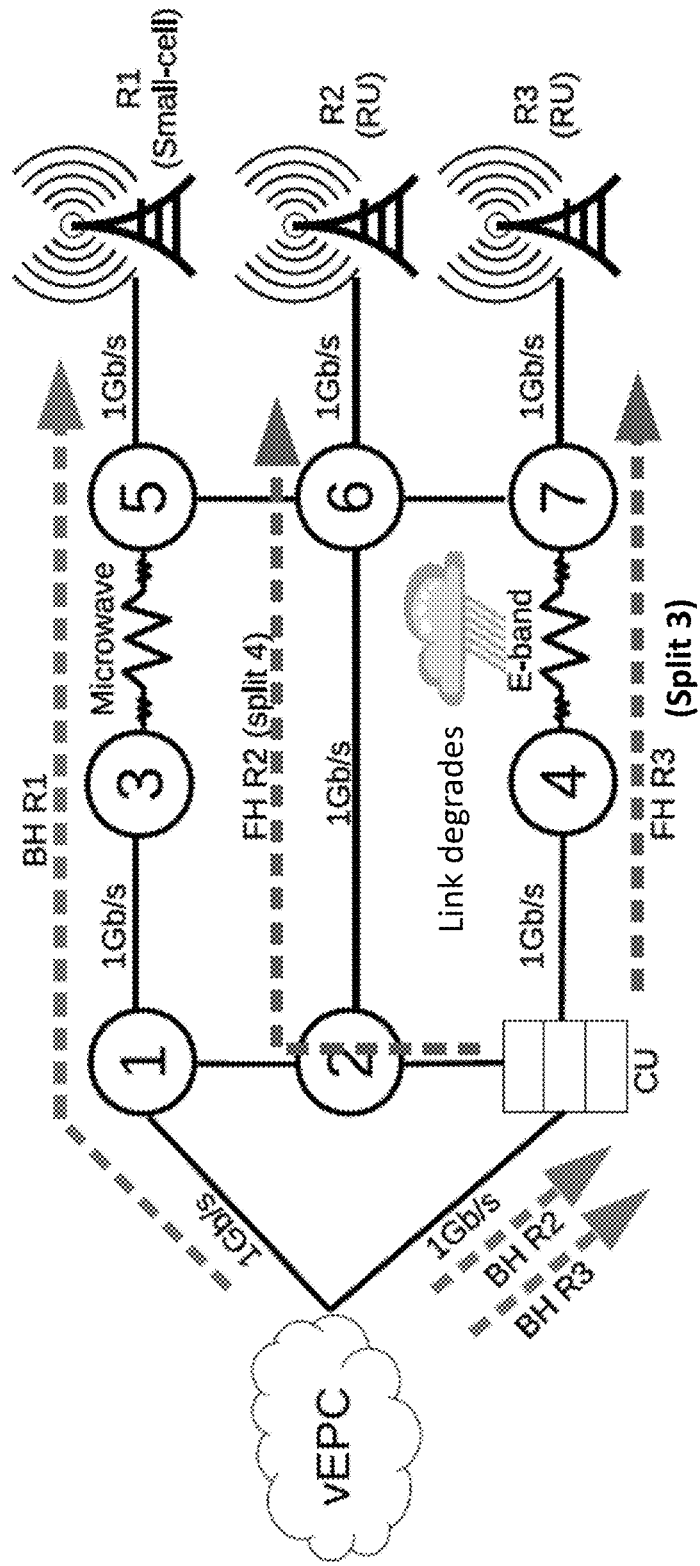
FIG. 5 is a structural diagram depicting components of the radio access network (RAN) of FIG. 4 having a second functional configuration according to an embodiment of the invention.

FIG. 5 is a structural diagram depicting components of the radio access network (RAN) of FIG. 4 having a second functional configuration according to an embodiment of the invention. In FIG. 5, the link between the node 4 and 7 has degraded, e.g. due to weather changes, relative to its condition in FIG. 4. In response to detected the degradation of the link between them, the nodes 4 and 7 will automatically adapt the modulation and coding scheme (MCS) used on said link, e.g., using adaptive modulation radio (AMR). The MCS change results in a reduction in the available capacity of the link. Once the capacity of the link between nodes 4 and 7 falls below a certain threshold, those nodes locally determine, according to local control logic, a functional split for the fronthaul network FH R3 that is the most appropriate given the change in the conditions of the link between 4 and 7. In FIG. 5, the nodes 4 and 7 determine that a reconfiguration of the fronthaul network FH R3 to split 3 is appropriate. After determining that a reconfiguration to split 3 is appropriate, the nodes 4 and 7 inform the radio unit R3 and the centralized processing unit CU of the reconfiguration, e.g. via in-switch packet generation methods (using PacketTemplates). Furthermore, in order to maintain an up-to-date control plane, the nodes that apply the changes necessary to implement the reconfiguration to split 3 inform a centralized SDN controller (not shown in the figures) of the changes.

Figure 6:
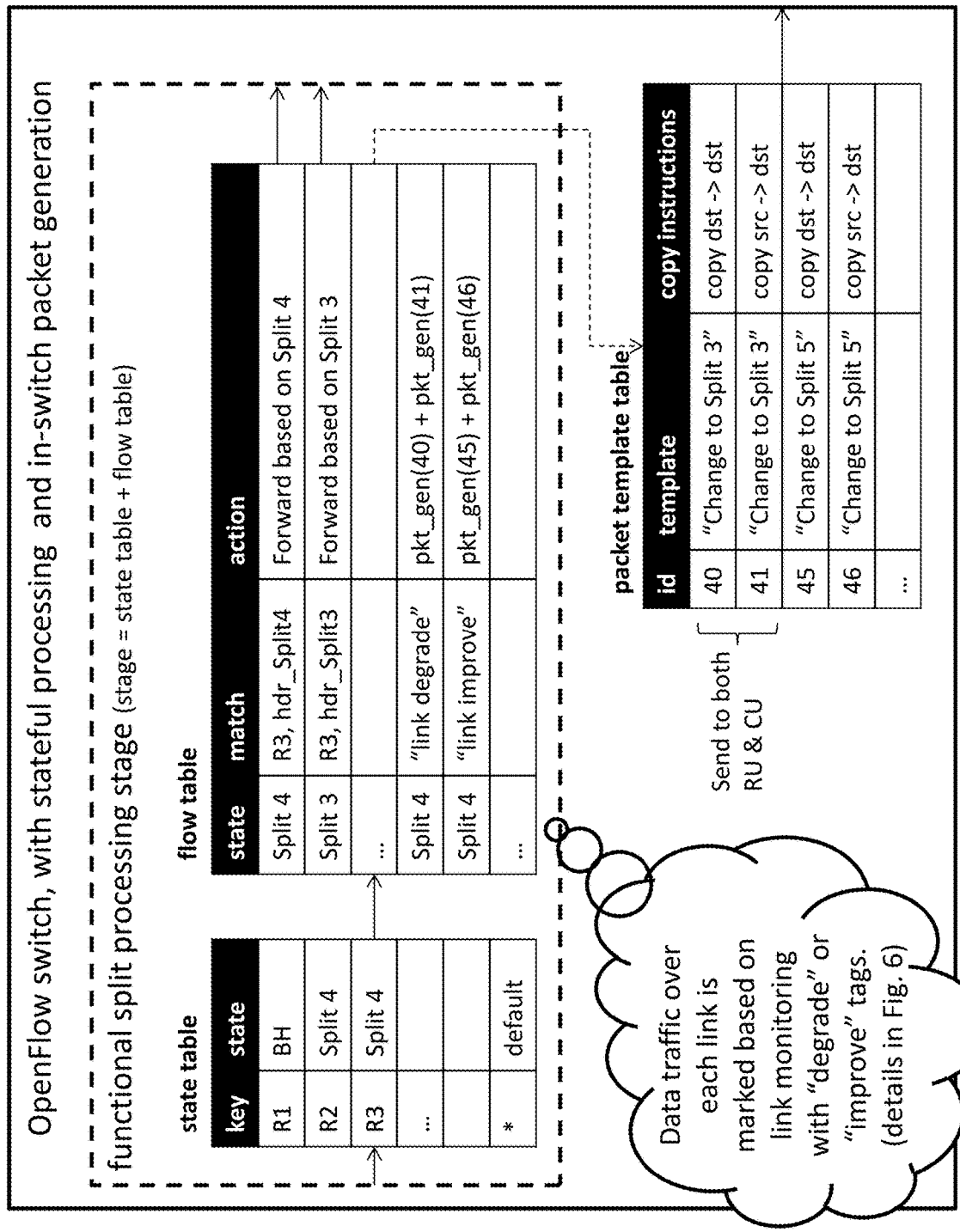
FIG. 6 demonstrates a processing pipeline of a data plane node using OpenFlow according to an embodiment of the present invention.

FIG. 6 demonstrates a processing pipeline of a data plane node using OpenFlow according to an embodiment of the present invention. The processing pipeline consists of a flow table, a state table, and a packet template table. In addition, a local control logic is programmed inside the node, e.g. via a central SDN controller. Methods according to embodiments of the present invention include monitoring links between a radio unit and a central processing unit and detecting changes in network conditions. Once a degradation in a network metric below a pre-programmed acceptable level is detected, methods according to embodiments of the invention can mark all data traffic over the link at which the degradation was detected with a "link degraded" tag. Similarly, when a metric of the link improves above a certain level, methods according to embodiments of the invention can mark all data traffic over that link with a "link improved" tag. For notifying RUs and CUs of a required change in an RAN functional split, embodiments of the present invention can encode a current functional split (state column) per RU (key column) in the state table of the "functional split processing stage." For example, FIG. 6 includes the state of the small-cell R1 from FIG. 4 as being in state BH and includes the state of radio units R2 and R3 as being in state "split 4."

In the next step in the processing pipeline (cf. flow table), a first set of rules are utilized for regular forwarding of traffic. The first set of rules specifies actions to be taken that differ based on the current functional split. The rules may include executing a matching on the inner header fields of a certain functional split, which may or may not be used to decide the forwarding behavior. In FIG. 6, the inside headers of split ¾, i.e. "hdr_Split_¾," are optional to use to match to different forwarding actions. Each combination of split and RU can have multiple rules (e.g. up/downlink, different paths, load-balancing).

A second set of rules is specified for cases in which a link quality degrades or improves. Such a change in link quality can cause an RAN functional split to change. For example, in FIG. 6, when a current RAN functional split, i.e. "split 4," is matched with a "link degrade" marking in respective data traffic, the second set of rules specifies that two packets are to be generated: one according to template rule #40 and another according to template rule #41. Similarly, when a current RAN functional split, i.e. "split 4," is matched with a "link improve" marking in respective data traffic, the second set of rules also specifies that two packets are to be generated: one according to template rule #45 and one according to template rule #46. In different embodiment, the rules can be pre-configured by the SDN controller or can be statically programmed into the data plane nodes.

In order to avoid flooding of split change messages, packet generation rules can be equipped with an inactivity timer that disables them for a predefined period of time. Alternatively a higher (relative to the packet generation rules) priority rule to not generate packets with a timeout can be specified, thereby avoiding triggering the match that generates the "split change" packets. Once the timeout is reached this high priority rule is removed.

When the action in the flow table prescribes a packet generation, the respective packet generation rule (via the ID number) in the packet template table can be used to assemble and send out a packet. For example, in FIG. 6 packet generation rule #40 specifies the packet template "Change to Split 3" and copy instructions specify that a destination address in the template should be replaced with a destination address of the data packet triggering the packet generation. Together with rule #41, in which the destination address in the template is replaced with the source address of the data packet triggering the packet generation, this results in both the RU and CU being notified of the need to change the functional split.

In order to remove unnecessary information from the packets, the switches should remove the degrade/improve marking before sending them out onto the network.

Figure 7:
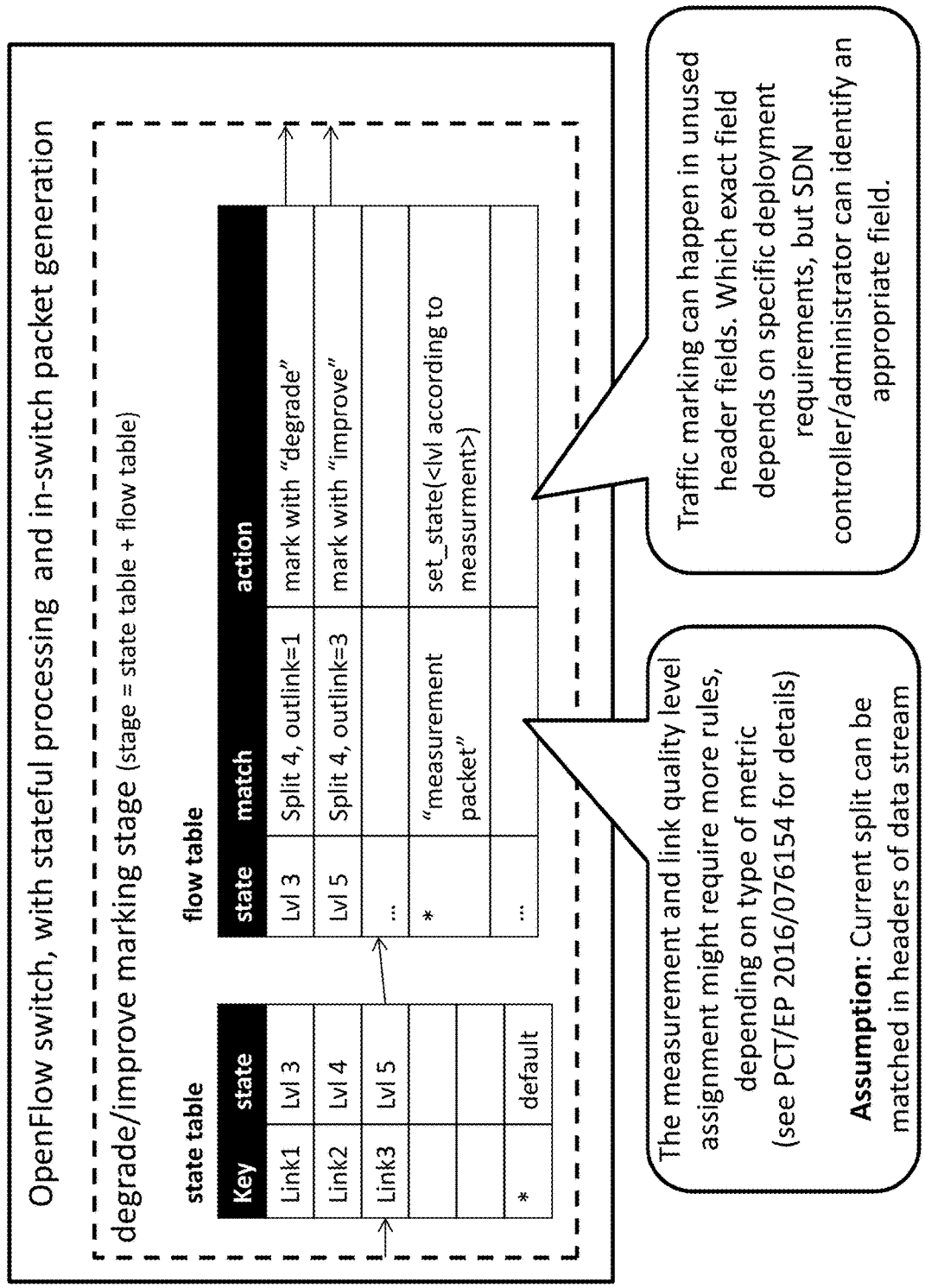
FIG. 7 demonstrates an application of link quality change markings according to an embodiment of the present invention.

FIG. 7 demonstrates an application of link quality change markings according to an embodiment of the present invention. FIG. 7 demonstrates how data packets are marked when link quality changes are detected. The process of marking data packets with link quality changes will happen in the same data plane node for which the processing pipeline of FIG. 6 is applicable but in a different processing stage, i.e. a "degrade/improve marking stage."

In FIG. 7, the state table encodes a current link quality level (state column) for all the links (key column) present in a network element. In the flow table, if the current link quality (state) does not match the functional split requirements (e.g. insufficient capacity) as inferred from the data traffic for a specific link, the packets are marked. In the example depicted in FIG. 7, the quality level number matches the functional split indicator. If a link quality is below a required capacity of a particular functional split (e.g. "Lvl 3" is below the capacity requirement of "Split 4") packets should be marked with "degrade." On the other hand, if a link quality is above a required capacity of a particular functional split, packets can be marked with "improve." A current split option can be matched in headers of the data stream. Traffic marking can also be performed in unused header fields. Which exact fields are unused depends on specific deployment requirements, but the SDN controller/administrator can identify an appropriate field.

The bottom of the flow table demonstrates how to update the link quality in the state table. The measurement and link quality level assignment might require more rules, depending on type of metric(s) used, e.g. a round-trip time measurement, a one-way delay measurement, a jitter measurement, a throughput measurement, and/or an available bandwidth measurement. This logic of what a functional split requires in terms of link quality will need to be programmed by the controller in advance.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for dynamically configuring radio access network (RAN) functional splits in a RAN including a control plane and a data plane, the control plane including a software defined network (SDN) controller, and the data plane including a plurality of radio units, a plurality of central processing units, and a plurality of data plane forwarding nodes, the method comprising:

monitoring, by a first data plane forwarding node of the plurality of data plane forwarding nodes, a quality of a portion of a data plane link between a first radio unit of the plurality of radio units and a first central processing unit of the plurality of central processing units, wherein the portion of the data plane link is a connection between the first data plane forwarding node and one of the first radio unit, the first central processing unit, or a second data plane forwarding node of the plurality of data plane forwarding nodes;
determining, by the first data plane forwarding node, that the quality of the portion of the data plane link has changed relative to a previous quality of the portion of the data plane link;
generating, by the first data plane forwarding node in response to determining that the quality of the portion of the data plane link has changed and according to local control logic programmed into the first data plane forwarding node, a decision specifying a first RAN functional split, wherein the first RAN functional split indicates a location, selected from the first radio unit and the first central processing unit, at which each of one or more RAN baseband processing functions is to be performed; and
transmitting, by the first data plane forwarding node to the first radio unit and the first central processing unit, one or more first notifications indicating the first RAN functional split.

2. The method of claim 1, further comprising receiving, by the first data plane forwarding node, programming from the SDN controller by which the local control logic is programmed into the first data plane forwarding node.

3. The method of claim 2, further comprising transmitting, by the first data plane forwarding node to the SDN controller, a second notification including the decision specifying the placement for the one or more RAN functions.

4. The method of claim 1, wherein the monitoring the quality of the portion of the data plane link comprises taking one or more of a round-trip time measurement, a one-way delay measurement, a jitter measurement, a throughput measurement, and an available bandwidth measurement.

5. The method of claim 1, wherein the determining that the quality of the portion of the data plane link has changed relative to a previous quality of the portion of the data plane link comprises determining that one or more of a round-trip time measurement, a one-way delay measurement, a jitter measurement, a throughput measurement, and an available bandwidth measurement taken at a first point in time differs by a threshold amount from a corresponding round-trip time measurement, one-way delay measurement, jitter measurement, throughput measurement, and/or available bandwidth measurement taken at a second point in time.

6. The method of claim 1, further comprising forwarding, by the first data plane forwarding node, traffic between the first radio unit and the first central processing unit according to a set of rules determined according to the first RAN functional split.

7. The method of claim 2, further comprising starting, in response to the generating the decision specifying the first RAN functional split, a timer that determines a time interval during which the specified RAN functional split will remain effective.

8. The method of claim 7, wherein at the end of the time interval, the method further comprises:
determining a default set of rules specifying a set of default RAN functional splits, wherein the default set of rules is determined by the SDN controller; and
forwarding, by the first data plane forwarding node, traffic between the first radio unit and the first central processing unit according to a default RAN functional split of the set of default RAN functional splits specified by the default set of rules.

9. The method according to claim 1, wherein the generating a decision specifying the first RAN functional split is triggered by the determining that the quality of the portion of the data plane link has changed relative to the previous quality of the portion of the data plane link.

10. The method according to claim 1, wherein the one or more RAN baseband processing functions to be performed include one or more of physical layer functions, data link layer functions, and network layer functions.

11. A first data plane forwarding node of a data plane of a radio access network (RAN), the RAN including a control plane and the data plane, the control plane including a software defined network (SDN) controller, and the data plane including a plurality of radio units, a plurality of central processing units, and a plurality of additional data plane forwarding nodes, the data plane forwarding node comprising:
a processor; and
a non-transitory processor readable medium having stored thereon processor executable instructions for:
monitoring a quality of a portion of a data plane link between a first radio unit of the plurality of radio units and a first central processing unit of the plurality of central processing units, wherein the portion of the data plane link is a connection between the first data plane forwarding node and one of the first radio unit, the first central processing unit, or a second data plane forwarding node of the plurality of additional data plane forwarding nodes,
determining that the quality of the portion of the data plane link has changed relative to a previous quality of the portion of the data plane link,
generating, in response to determining that the quality of the portion of the data plane link has changed and according to local control logic programmed into the first data plane forwarding node, a decision specifying a first RAN functional split, wherein the first RAN functional split indicates a location, selected from the first radio unit and the first central processing unit, at which each of one or more RAN baseband processing functions is to be performed; and
transmitting, to the first radio unit and the first central processing unit, one or more first notifications indicating the first RAN functional split.

12. A system for dynamically configuring radio access network (RAN) functional splits in a RAN including a control plane and a data plane, the control plane including a software defined network (SDN) controller, and the data plane including a plurality of radio units, a plurality of central processing units, and a plurality of data plane forwarding nodes, the system comprising:
a first data plane forwarding node of the plurality of data plane forwarding nodes, the first data plane forwarding node comprising a processor and a non-transitory processor readable medium having stored thereon processor executable instructions for:
monitoring a quality of a portion of a data plane link between a first radio unit of the plurality of radio units and a first central processing unit of the plurality of central processing units, wherein the portion of the data plane link is a connection between the first data plane forwarding node and one of the first radio unit, the first central processing unit, or a second data plane forwarding node of the plurality of data plane forwarding nodes,
determining that the quality of the portion of the data plane link has changed relative to a previous quality of the portion of the data plane link,
generating, in response to determining that the quality of the portion of the data plane link has changed, a decision specifying an RAN functional split, wherein the first RAN functional split indicates a location, selected from the first radio unit and the first central processing unit, at which each of one or more RAN baseband processing functions is to be performed, and transmitting, to the first radio unit and the first central processor of the RAN, one or more first notifications indicating the first RAN functional split; and the SDN controller.

13. The method according to claim 1, wherein one or more RAN baseband processing functions to be performed include one or more physical layer functions, data link layer functions, and network layer functions, the method further comprising:

transmitting, by the first data plane forwarding node to the SDN controller, a second notification including the decision specifying the placement for the one or more RAN baseband processing functions; and forwarding, by the first data plane forwarding node, traffic between the first radio unit and the first central processing unit according to a set of rules determined according to the first RAN functional split.

14. The method according to claim 1, wherein the local control logic programmed into the first data plane forwarding node includes a flow table that specifies a first set of rules for regular forwarding of traffic and a second set of rules for cases in which a link quality degrades or improves.

15. The method according to claim 14, wherein the second set of rules prescribes packet generation for pairs of current RAN functional splits and one of a link degrade or a link improve marking.

16. The method according to claim 15, wherein the second set of rules prescribes, for each pair of a current RAN functional split and one of the link degrade or the link improve marking, a packet template to be used for generating, as the one or more first notifications, a first packet destined for the first radio unit and/or a second packet destined for the first central processing unit.

17. The method according to claim 1, wherein the decision specifying the first RAN functional split generated by the first data plane forwarding node conflicts with a second decision specifying an alternative second RAN functional split made by the SDN controller, and resolving the conflict between the decision specifying the first RAN functional split and the second decision specifying the alternative second RAN functional split according to a timer-based approach and/or a command-based approach.

18. The method according to claim 1, wherein the first data plane forwarding node is remotely located from the SDN controller.

19. The method according to claim 1, wherein the first data plane forwarding node, the first radio unit, and the first central processing unit are all remotely located from one another and separated from one another.

20. The method according to claim 19, wherein the portion of the data plane link is a wireless connection between the first data plane forwarding node and a second data plane forwarding node, wherein the first data plane forwarding node connected to the first radio unit by a second portion of the data plane link, and wherein the second data plane forwarding node is connected to the first central processing unit by a third portion of the data plane link.

21. The method according to claim 1, further comprising determining, by a third data plane forwarding node of the plurality of data plane forwarding nodes, that a quality of a second portion of the data plane link has changed relative to a previous quality of the portion of the data plane link, wherein the second portion of the data plane link is a connection between the third data plane forwarding node and one of the first radio unit, the first central processing unit, the first data plane forwarding node, the second data plane forwarding node, or a fourth data plane node of the plurality of data plane forwarding nodes;

generating, by the third data plane forwarding node in response to determining that the quality of the second portion of the data plane link has changed and according to local control logic programmed into the third data plane forwarding node, a second decision specifying a second RAN functional split, wherein the second RAN functional split indicates a location, selected from the first radio unit and the first central processing unit, at which each of the one or more RAN baseband processing functions is to be performed, wherein the second RAN functional split conflicts with the first RAN functional split;

determining, by at least one of the first radio unit and the first central processing unit, which of the first RAN functional split and the second RAN functional split has lower fronthaul network requirements; and implementing, by the first radio unit and the first central processing unit, the determined RAN functional split having the lower fronthaul network requirements.

* * * * *